(12) United States Patent
Troy

(10) Patent No.: US 7,753,315 B2
(45) Date of Patent: Jul. 13, 2010

(54) PAYLOAD DELIVERY VEHICLE AND METHOD

(75) Inventor: John R. Troy, Huntsville, AL (US)

(73) Assignee: Teledyne Solutions, Inc., Huntsville, AL (US)

( * ) Notice: Subject to any disclaimer, the term of this patent is extended or adjusted under 35 U.S.C. 154(b) by 0 days.

(21) Appl. No.: 11/108,222

(22) Filed: Apr. 18, 2005

(65) Prior Publication Data
US 2005/0230517 A1    Oct. 20, 2005

Related U.S. Application Data

(60) Provisional application No. 60/563,745, filed on Apr. 19, 2004.

(51) Int. Cl.
*B64G 1/40* (2006.01)
*B64C 15/02* (2006.01)
*B64D 41/00* (2006.01)

(52) U.S. Cl. .................. 244/171.3; 244/15; 244/58; 244/74

(58) Field of Classification Search ........... 244/171.4, 244/158.9, 159.1, 2, 74, 171.3, 58, 73 R
See application file for complete search history.

(56) References Cited

U.S. PATENT DOCUMENTS

| | | | | |
|---|---|---|---|---|
| 3,215,372 A | * | 11/1965 | Price | 244/74 |
| 3,430,445 A | * | 3/1969 | Smith, Jr. | 60/245 |
| 4,802,639 A | * | 2/1989 | Hardy et al. | 244/2 |
| 5,295,642 A | * | 3/1994 | Palmer | 244/2 |
| 5,564,648 A | * | 10/1996 | Palmer | 244/2 |
| 5,740,985 A | * | 4/1998 | Scott et al. | 244/2 |
| 5,826,827 A | * | 10/1998 | Coyaso et al. | 244/139 |
| 6,227,486 B1 | * | 5/2001 | Balepin | 244/73 R |
| 6,398,166 B1 | * | 6/2002 | Ballard et al. | 244/158.1 |
| 6,450,452 B1 | * | 9/2002 | Spencer et al. | 244/159.3 |
| 6,454,216 B1 | * | 9/2002 | Kiselev et al. | 244/159.3 |
| 6,612,522 B1 | * | 9/2003 | Aldrin et al. | 244/2 |
| 6,817,580 B2 | * | 11/2004 | Smith | 244/158.9 |
| 2003/0080241 A1 | * | 5/2003 | Shpigler et al. | 244/2 |
| 2003/0121404 A1 | * | 7/2003 | O'Dwyer | 89/1.41 |

OTHER PUBLICATIONS

"Info About Hornets" Unknown author, Apr. 19, 2001, via the Internet Archive http://web.archive.org/web/20010419064204/http://www.voodoo.cz/hornet/info.html.*

(Continued)

*Primary Examiner*—Tien Dinh
*Assistant Examiner*—Joseph W Sanderson
(74) *Attorney, Agent, or Firm*—K&L Gates LLP

(57) ABSTRACT

An un-manned multi-stage payload delivery vehicle and methods of deployment therefore are disclosed. According to various embodiments, the payload delivery vehicle includes first stage and a second stage. At least one of the first and second stages comprises a jet engine. According to various embodiments, methods of deploying the payload delivery vehicle include the steps of launching the payload delivery vehicle from a launch site, controlling the flight of the payload delivery vehicle in accordance with one or more deployment parameters, deploying a payload attached to the payload delivery vehicle, and controlling the flight of the payload delivery vehicle subsequent to payload deployment such that the payload delivery vehicle is flown to a pre-determined location for recovery and reuse.

13 Claims, 6 Drawing Sheets

OTHER PUBLICATIONS

"Cape Canaveral Rocket and Missile Programs: Athena II" Lethbridge, Cliff, 2001, Spaceline http://www.spaceline.org/rocketsum/athena-II.html.*

"Lunar Prospector: Launch Vehicle" NASA, last updated Oct. 2001 http://lunar.arc.nasa.gov/project/launch.htm.*

Genesis Mission Homepage NASA, Nov. 2002, http://web.archive.org/web/20021124212148/http://genesismission.jpl.nasa.gov/.*

"AIM-7 Sparrow" Wikipedia, The Free Encyclopedia, Apr. 6, 2004 http://en.wikipedia.org/w/index.php?title=AIM-7_Sparrow&oldid=3325717.*

"MiG-21 Vairants" Baturan, Luka, May 23, 2000, YUModelClub, via the internet archive http://web.archive.org/web/20000523060454/http://members.tripod.com/YUModelClub/yugoslav_air_force/mig21/mig21var.htm.*

"F-15 Origins and Variants" Goebel, Greg, Jul. 1, 2003 http://www.faqs.org/docs/air/avf15_1.html.*

"ASM-135 ASAT" Wikipedia, The Free Encyclopedia, Sep. 5, 2008 http://en.wikipedia.org/wiki/ASM-135_ASAT.*

"The Ejection Site—The ACES II Seat: History" Coyne, Kevin, Dec. 5, 2002, via the internet archive http://web.archive.org/web/20021205213901/http://www.ejectionsite.com/acesii.htm.*

GAM-87 Skybolt Wikipedia, the Free Encyclopedia, Apr. 13, 2004 http://en.wikipedia.org/w/index.php?title=GAM-87_Skybolt&oldid=3264442.*

"Pratt & Whitney TF33" Scramble, Dutch Avaiation Society, Jun. 17, 2008 http://www.scramble.nl/wiki/index.php?title=Pratt_%26_Whitney_TF33.*

"Weapons Factsheets from United States Navy's BBS" United States Department of the Navy, Nov. 8, 2002 http://www.ibiblio.org/pub/academic/history/marshall/military/navy/USN_weapons.txt.*

"The Zero-Length Launch Fighter" Goebel, Greg, Feb. 5, 2004, via internet archive http://web.archive.org/web/20040205062156/http://www.vectorsite.net/avzel.html.*

* cited by examiner

PAYLOAD DELIVERY VEHICLE AND METHOD

CROSS-REFERENCE TO RELATED APPLICATION

This application claims priority under 35 U.S.C. §119(e) to U.S. Provisional Patent Application No. 60/563,745 filed 04/19/2004.

TECHNICAL FIELD OF THE INVENTION

The present invention relates generally to payload delivery vehicles, and more particularly, to payload delivery vehicles having at least one jet engine.

BACKGROUND

A significant problem facing the evaluation of tactical ballistic missile interceptor systems is the limited number of battle representative test scenarios that may be simulated using a conventional rocket-powered target delivery vehicle launched from a fixed-location launch site. Efforts in recent years have focused on the development of mobile launch platforms (MLPs) for use with aircraft and ships. Because MLPs must typically accommodate multiple target vehicle designs, however, their complexity and cost of deployment is often considerable. Additionally, because MLPs are subject to treaty-imposed restrictions, their deployment locations are limited.

Other problems facing the evaluation of tactical ballistic missile interceptor systems relate to the expense and limited flexibility inherent to conventional rocket-powered target vehicle designs. Because such vehicles typically utilize only non-reusable solid-propellant rocket motors, a considerable portion of the vehicle's operational cost is consumed by the purchase of new rocket motors for each launch. The need for specialized launch equipment and launch support personnel also adds to the operational cost. In addition to cost issues, solid-propellant rocket motors are generally inefficient and provide limited range and payload options. Moreover, because rocket motors are typically non-throttleable and provide limited flight maneuverability, the accuracy of the desired aimpoint arrival conditions for a target delivered by the target delivery vehicle is limited.

Thus, what is needed is a target delivery vehicle that may be launched from a fixed location and is capable of simulating a variety of threat-representative scenarios necessary for the robust and cost-effective evaluation of tactical ballistic missile interceptor systems.

SUMMARY

In one general aspect, embodiments of the present invention are directed to an un-manned multi-stage payload delivery vehicle comprising a first stage and a second stage. According to various embodiments, at least one of the first stage and the second stage comprises a jet engine.

In another general aspect, embodiments of the present invention are directed to an un-manned reusable launch vehicle. According to various embodiments, the launch vehicle comprises a jet engine attached to an airframe assembly, at least one air intake assembly for directing an airflow into the jet engine, and at least one fuel tank for storing a fuel supply for the jet engine.

In another general aspect, embodiments of the present invention are directed to an un-manned reusable launch vehicle for deploying an intercept vehicle target at a location remote from a launch site of the launch vehicle. According to various embodiments, the launch vehicle includes a jet engine and a guidance, navigation and control (GNC) assembly. According to various embodiments, the GNC assembly is configured to control the flight of the launch vehicle such that the target is deployed in accordance with one or more deployment parameters and such that the launch vehicle is flown to a pre-determined location subsequent to the target deployment for recovery.

In another general aspect, embodiments of the present invention are directed to a method of deploying an un-manned multi-stage payload delivery vehicle. According to various embodiments, the method includes launching the payload delivery vehicle from a launch site, controlling the flight of the payload delivery vehicle in accordance with one or more deployment parameters, deploying a payload attached to the payload delivery vehicle, and controlling the flight of the payload delivery vehicle subsequent to payload deployment such that the payload delivery vehicle is flown to a pre-determined location for recovery and reuse.

Unless otherwise indicated, all numbers expressing magnitudes of force, distance, velocity, acceleration, time, location, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

The reader will appreciate the foregoing details and advantages of the present invention, as well as others, upon consideration of the following detailed description of embodiments of the invention. The reader also may comprehend such additional details and advantages of the present invention upon making and/or using embodiments within the present invention.

DESCRIPTION OF THE FIGURES

Various embodiments of the invention will be described by way of example in conjunction with the following figures, wherein.

DESCRIPTION

In one general aspect, embodiments of the present invention are directed to an un-manned multi-stage payload delivery vehicle comprising a first stage and a second stage. According to various embodiments, at least one of the first stage and the second stage comprises a jet engine. Such vehicles and methods are useful for, among other things, enacting threat-representative scenarios for the evaluation of tactical ballistic missile interceptor systems.

Figure 1A:
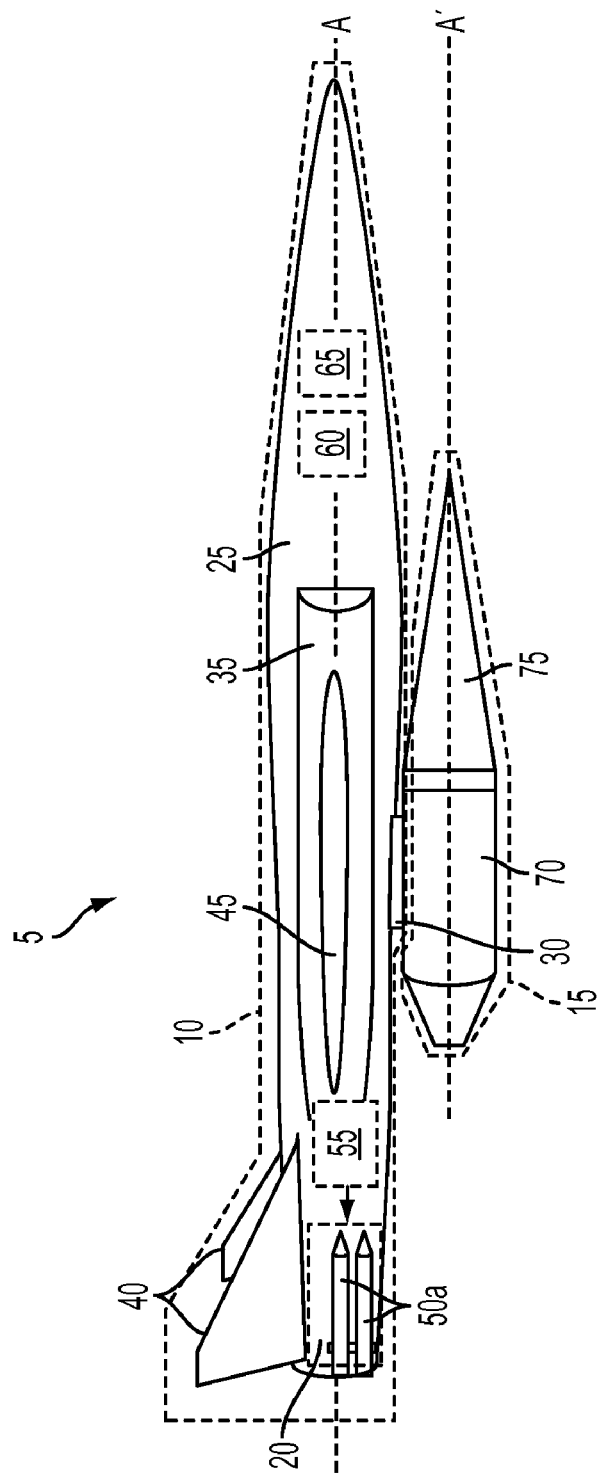
FIG. 1a illustrates a left elevational view an un-manned multi-stage payload delivery vehicle, according to various embodiments.
Figure 1B:
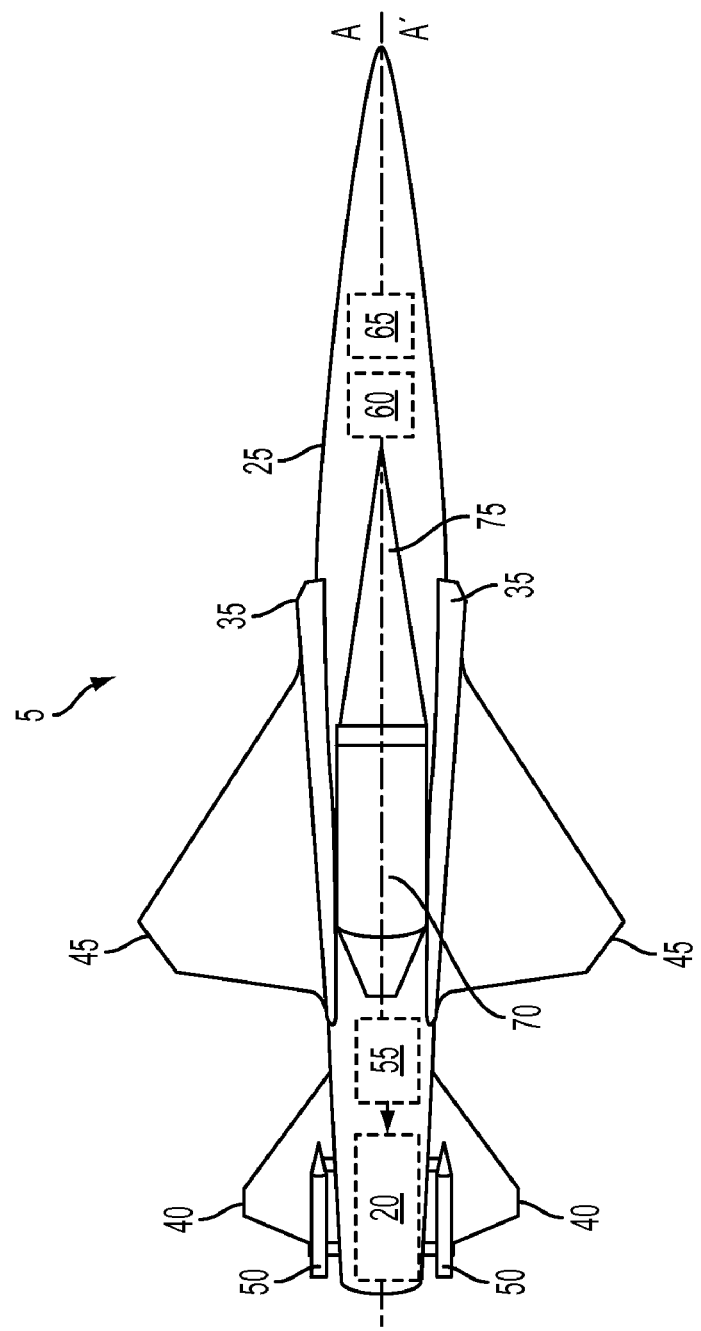
FIG. 1b illustrates a bottom view of the un-manned multi-stage payload delivery vehicle of FIG. 1a, according to various embodiments.

FIGS. 1a and 1b illustrate left elevational and bottom views, respectively, of an un-manned multi-stage payload delivery vehicle 5, according to various embodiments. The payload delivery vehicle 5 may comprise a first stage 10 and a second stage 15. The first stage 10 may comprise one or more of a jet engine 20, an airframe assembly 25, a pylon assembly 30, one or more air intake assemblies 35, one or more stabilizers 40, one or more wings 45, one or more solid-propellant booster rocket motors 50, a fuel tank 55, a recovery system 60, and a guidance, navigation and control (GNC) assembly 65. The second stage 15 may comprise a solid-propellant rocket motor 70 and a payload 75.

Figure 2:
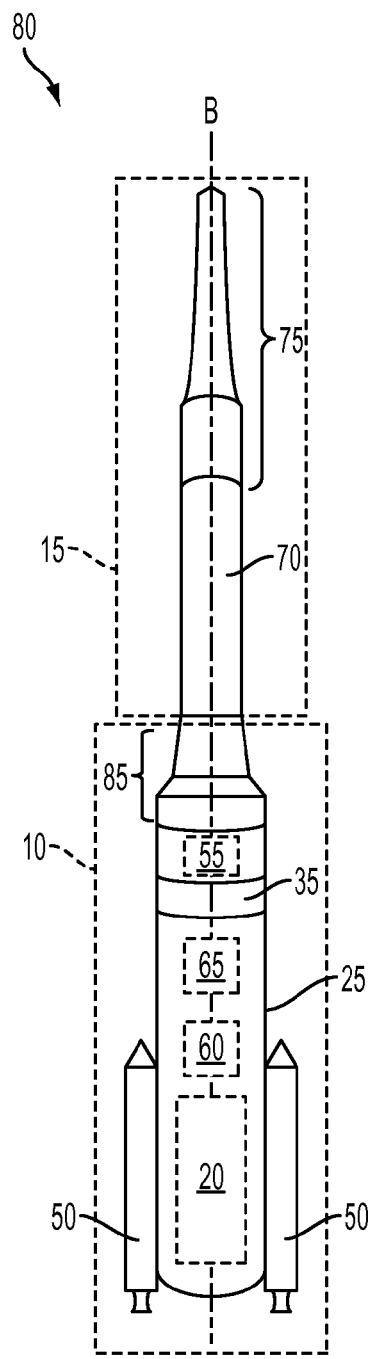
FIG. 2 illustrates an un-manned multi-stage payload delivery vehicle, according to various embodiments.

FIG. 2 illustrates an un-manned multi-stage payload delivery vehicle 80, according to various embodiments. The payload delivery vehicle 80 may comprise a first stage 10 and a second stage 15. The first stage 10 may comprise one or more of a jet engine 20, an airframe assembly 25, one or more air intake assemblies 35, one or more solid-propellant booster rocket motors 50, a fuel tank 55, a recovery system 60, a GNC assembly 65, and an interstage assembly 85. The second stage 15 may comprise a solid-propellant rocket motor 70 and a payload 75.

According to various embodiments of the payload delivery vehicle 5, 80, the jet engine 20 may be of a conventional air-breathing design and comprise an air inlet stage (not shown) and a combustion stage (not shown). During vehicle 5, 80 operation, airflow collected by the one or more air intake assemblies 35 may be directed into the jet engine 20 via the air inlet stage, compressed, mixed with fuel supplied from the fuel tank 55, and burned in the combustion stage to generate thrust. According to various embodiments, the jet engine 20 may be a turbofan jet engine and further comprise a turbine stage (not shown) for converting combustion gas flow into mechanical energy, and a fan stage (not shown) powered by the turbine stage for increasing the velocity of airflow received by the air inlet stage.

In a turbofan jet engine, only a portion of airflow passing through the fan stage is used for combustion. The remaining airflow bypasses the combustion stage and is ducted to the rear of the jet engine to provide additional thrust. The ratio of bypassed air to combustion air (the "bypass ratio") is a commonly-used classification factor for turbofan jet engines. According to various embodiments, the jet engine 20 may be a low-bypass turbofan jet engine having a bypass ratio of 2 or less. For example, the jet engine 20 may be a General Electric (GE) F110 low-bypass turbofan jet engine frequently used in military aircraft applications. According to such embodiments, the jet engine 20 may further comprise an afterburner stage (not shown) for augmenting thrust by introducing fuel directly into the exhaust stream of the jet engine 20. Although generally less efficient than high-bypass turbofan jet engines used in commercial aircraft, low-bypass turbofan jet engines exhibit better thrust and maneuverability characteristics at low supersonic speeds.

Utilizing the jet engine 20 as an alternative to a conventional solid-propellant rocket motor in at least the first stage 10 of the payload delivery vehicle 5, 80 provides several advantages. First, the thrust-to-mass ratio of a jet engine typically exceeds that of commercially-available solid-propellant rocket motors. For example, the dry thrust-to-mass ratio of the GE F110 low-bypass turbofan jet engine is approximately 6.88, whereas the thrust-to-mass ratios for the Castor IVB solid-propellant rocket motor manufactured by Thiokol Propulsion and the M57A1 solid-propellant rocket motor manufactured by Alliant Techsystems are approximately 3.63 and 4.02, respectively. Even with the addition of the maximum expected fuel weight required for operation of the payload delivery vehicle 5, 80, the GE F110 jet engine has an estimated thrust-to-mass ratio of approximately 5.00. Accordingly, the use of the jet engine 20 in at least the first stage 10 enables the payload delivery vehicle 5, 80 to be used for a variety of range and payload configurations that would otherwise require the use of multiple rocket motor configurations, and thus, multiple rocket-powered payload delivery vehicle designs.

A second advantage of using the jet engine 20 is that the first stage 10 may be recovered and reused after each flight of the payload delivery vehicle 5, 80 and, in certain cases, with little or no refurbishment. In particular, because the recovery system 60 of the first stage 10 is configured to deploy after in-flight operation of the jet engine 20 is terminated, ground impact damage to the first stage 10 is minimized. Accordingly, the cost of the jet engine 20 and other first stage components may be spread across numerous launches, thus reducing the operational cost of the payload delivery vehicle 5, 80. Solid-propellant rocket motors, by contrast, are typically designed for one-time use and thus may represent a significant and recurring portion of operational cost. According to various embodiments, a further reduction in operational cost may be realized by using a "non-manrated" jet engine. In particular, the jet engine 20 may be a non-man-rated jet engine obtained at relatively little cost from fighter aircraft that have passed the end of their man-rated service life and are no longer economical to keep in the operational fleet. Jet engines obtained from these "parked" aircraft typically have hundreds of hours of useful life remaining. Because flights of the payload delivery vehicle 5, 80 may only be several hours in duration, and because the jet engine 20 is returned with the airframe assembly 25, jet engine 20 changes may be kept to a minimum.

A third advantage of using the jet engine 20 is that various deployment parameters of the payload delivery vehicle 5, 80 may be precisely controlled by throttling the jet engine 20 to control thrust. Such parameters may include, for example, the ignition state vector of the second stage 15, i.e., the position, velocity, and acceleration of the payload delivery vehicle 5, 80 at which the solid-propellant rocket motor 70 is ignited. Control of the ignition state vector in this fashion allows for an extremely accurate time of arrival of the payload 75 at a desired location. Additionally, the throttling capability allows the time of arrival of the payload delivery vehicle 5, 80 at the location for second stage 15 ignition to be increased or decreased as desired. Still further, jet engine 20 thrust may be controlled to provide a loitering capability for the payload delivery vehicle 5, 80 whereby the payload delivery vehicle 5, 80 is flown about a fixed geographic location for a period of time prior to second stage 15 ignition. The loitering capability may be useful, for example, during a simulation of multiple engagement scenario in which a first payload delivery vehicle is launched and flown to a selected geographic location where it loiters until the arrival of a second payload delivery vehicle at the same location. At that time, second stage 15 ignition for both payload delivery vehicles may be performed in a narrow time frame or even simultaneously.

A fourth advantage of using the jet engine 20 is that the payload delivery vehicle 5, 80 may be launched using existing ground launch facilities. For example, embodiments of the payload delivery vehicle 5, 80 may be configured for launch using a conventional rail launch system or launch pad facility. By contrast, an MLP launch of a conventional rocket-based payload delivery vehicle by aircraft or ship typically requires the coordination of launch crews and the use of specialized launch equipment such as cradles and extraction systems.

A fifth advantage of using the jet engine 20 is that deployment parameters of the payload delivery vehicle 5, 80 may be tailored to achieve a desired thermal profile for the payload 75. The thermal profile may be, for example, a thermal profile that is consistent with a threat-representative infrared (IR) signature. In particular, optimal combinations of velocity and altitude may be determined prior to launch based on a payload 75 thermal profile desired at the time of second stage 15 ignition. Using this knowledge, known deficiencies in the thermal profile resulting from second stage 15 performance may be compensated for by adjusting, for example, the cruising altitude and/or ascent velocity of the payload delivery vehicle 5, 80 prior to second stage 15 ignition.

As noted above with respect to embodiments of the payload delivery vehicle 5, 80 shown in FIGS. 1a and b and FIG. 2, the first stage 10 may comprise an airframe assembly 25 attached to the jet engine 20. The airframe assembly 25 of the present invention may be any airframe assembly known to one skilled in the art. For example, the airframe assembly 25 may comprise a plurality of interconnected structural members (not shown) for defining the general shape of the first stage 10 and for providing attachment points and compartmentalized storage space for various components thereof, such as the jet engine 20. The airframe assembly 25 may further comprise a shell, or "skin", attached to the structural members and defining an aerodynamic exterior surface of the first stage 10. According to various embodiments, the shell may include materials and/or coatings for generating a pre-determined IR signature and/or a pre-determined radio-frequency (RF) signature during payload delivery vehicle 5, 80 flight.

As noted above with respect to embodiments of the payload delivery vehicle 5 shown in FIGS. 1a and b, the first stage 10 may comprise a pylon assembly 30. As shown in FIG. 1a, in certain embodiments the pylon assembly 30 may be attached to the underside of the airframe assembly 25 and configured for detachably coupling the first and second stages 10, 15. Alternatively, the pylon assembly 30 may be attached to the top side of the airframe assembly 25. Preferably, the pylon assembly 30 is attached in the center of the airframe assembly 25. When coupled, the orientation of the first and second stages 10, 15 may be such that the first and second stages 10, 15 define first and second parallel longitudinal axes A and A', respectively. The pylon assembly 30 may include one or more controllable release mechanisms (not shown) for enabling second stage 15 separation immediately prior to its ignition. The controllable release mechanisms may be, for example, pneumatically-activated separation nuts or other means for second stage 15 separation.

As noted above with respect to embodiments of the payload delivery vehicle 80 shown in FIG. 2, the first stage 10 may comprise an interstage assembly 85. The interstage assembly 85 may detachably couple the forward end of the first stage 10 to the second stage 15 via the aft-end of the solid-propellant rocket booster 70. In such an embodiment, the orientation of the first and second stages 10, 15 when coupled may be such that the first and second stages 10, 15 define a common longitudinal axis B. The interstage assembly 85 may be of a conventional design and configured to decouple the first and second stages 10, 15 prior to second stage 15 ignition using one or more controllable release mechanisms (not shown) such as, for example, pneumatically-activated separation nuts or other means for second stage 15 separation.

As noted above with respect to embodiments of the payload delivery vehicle 5 shown in FIGS. 1a and b, the first stage 10 may comprise one or more stabilizers 40 and one or more wings 45. The one or more stabilizers 40 may, typically, be affixed to the aft-end of the airframe assembly 25 and arranged in a V-tail configuration. Other known stabilizer configurations having the same or a differing number of stabilizers such as, for example, three stabilizers spaced at 90° or 120° intervals, vertical stabilizers, H-type stabilizers, or cruciform stabilizers, may also be used. The one or more wings 45 are affixed to the airframe assembly 25 at approximately the mid-body thereof and arranged in delta-wing configuration. Other known wing configurations such as, for example, rectangular wing or raked rectangular wing, may also be used. According to various embodiments, one or more of the stabilizers 40 and wings 45 may comprise at least one stationary control surface for providing in-flight stability and lift. In addition or as an alternative to the stationary control surfaces, one or more of the stabilizers 40 and wings 45 may comprise at least one movable control surface and corresponding actuator for providing the steering capabilities necessary to maintain the desired flight attitude and trajectory for the payload delivery vehicle 5, 80. As discussed in further detail below, manipulation of movable control surfaces may be performed automatically using control signals communicated to the actuators by the GNC assembly 65.

As noted above with respect to embodiments of the payload delivery vehicle 5, 80 shown in FIGS. 1a and b and FIG. 2, the first stage 10 may comprise at least one solid-propellant booster rocket motor 50. The one or more solid-propellant booster rocket motors 50 may be detachably coupled to the aft-end of the airframe assembly 25. During launch of the payload delivery vehicle 5, 80 and for a period to time thereafter, the booster rocket motors 50 may rapidly accelerate the payload delivery vehicle 5, 80, thus initiating airflow into the one or more air intake assemblies 35 sufficient for jet engine 20 operation. After burnout, the one or more booster rocket motors 50 may be jettisoned from the payload delivery vehicle 5, 80. Depending on the particular launch parameters of the payload delivery vehicle 5, 80 (e.g., size and type of booster rocket motor 50, vehicle 5, 80 weight, jet engine 20 thrust characteristics, type of launch system), any of a variety of known booster rocket motor configurations comprising at least one booster rocket motor 50 may be used. As shown in FIGS. 1a and 1b, for example, four booster rocket motors 50 may be used in a two-pair outboard configuration. As further exemplified in FIG. 2, two booster rocket motors 50 may be used in a one-pair outboard configuration.

As noted above with respect to embodiments of the payload delivery vehicle 5, 80 shown in FIGS. 1a and b and FIG. 2, the first stage 10 may comprise a recovery system 60. The recovery system 60 may be contained within a compartment of the airframe assembly 25 and comprise a recovery mechanism (not shown) configured for automatic deployment after operation of the jet engine 20 has terminated. According to various embodiments, the recovery mechanism may comprise one or more of a parachute, a parafoil, and a retractable landing skid for cushioning the first stage 10 landing so that first stage 10 components may be recovered and reused with minimal or no refurbishment. The parachute and/or parafoil may be configured such that the first stage 10 may be steerably maneuvered during its decent to increase landing accuracy. The location of the recovery system 60 within the airframe assembly 25 shown in FIGS. 1a and 1b and in FIG. 2 is by way of example only. In particular, the location of the recovery system 60 may depend upon, among other things, the type of recovery mechanism used and the dimensions of the first stage 10.

As noted above with respect to embodiments of the payload delivery vehicle 5, 80 shown in FIGS. 1a and b and FIG. 2, the first stage 10 may comprise a fuel tank 55. The fuel tank 55 stores a fuel supply for the jet engine 20 and may be housed within a compartment of the airframe assembly 25. The location of the fuel tank 55 shown in FIGS. 1a and 1b and FIG. 2 is by way of example only, as its location may vary depending upon weight distribution needs and other design considerations. Furthermore, although only one fuel tank 55 is shown, embodiments of the payload delivery vehicle 5, 80 may include a plurality of fuel tanks similar to fuel tank 55 and housed within the airframe assembly 25 in locations dictated by fuel weight distribution needs, among other things. According to such embodiments, fuel consumption from each of the fuel tanks 55 may be independently controlled in order to maintain the flight stability of the payload delivery vehicle 5, 80.

As noted above with respect to embodiments of the payload delivery vehicle 5, 80 shown in FIGS. 1a and b and FIG. 2, the first stage 10 may comprise a GNC assembly 65. According to various embodiments, the GNC assembly 65 may be housed in a compartment of the airframe assembly 25 and comprise microprocessor-based attitude control and guidance systems (not shown). The attitude control system may be configured to control various deployment parameters of the payload delivery vehicle 5, 80 such as, for example, position, velocity, acceleration, roll, pitch, and yaw, by adjusting jet engine 20 thrust and/or manipulating moveable control surfaces of the stabilizers 40 and wings 45. Desired parameter values may be communicated to the attitude control system from the guidance system. Additionally, the attitude control system may comprise one or more flight sensors and associated feedback control loops for detecting the deviation of a parameter from its desired value and making any necessary corrective adjustments thereto.

According to various embodiments, the guidance system may be a command-based guidance system in which guidance instructions are communicated to the guidance system from an externally-located source (e.g., ship, ground, aircraft) using electromagnetic transmissions. According to other embodiments, the guidance system may be a pre-set guidance system in which data relating to the desired deployment parameters are stored in the guidance system prior to the launch of the payload delivery vehicle 5, 80. According to still other embodiments, the guidance system may be a navigational-based guidance system and utilize one or more of inertial guidance, celestial guidance, or terrestrial guidance methods.

As noted above with respect to the embodiments of FIGS. 1a and 1b and FIG. 2, the second stage 15 may include a solid-propellant rocket motor 70. The solid-propellant rocket motor 70 of the second stage 15 may be detachably coupled to the payload 75 using, for example, a conventional motor adaptor (not shown) comprising a pneumatic separation system for releasing the payload 75 from solid-propellant rocket motor 70 after burnout. According to various embodiments, the solid-propellant rocket motor 70 may be configured to detachably couple to the first stage 10 via the pylon assembly 30, as shown in FIGS. 1a and 1b. According to other embodiments, the solid-propellant rocket motor 70 may be configured to detachably couple to the first stage 10 using the interstage assembly 85, as shown in FIG. 2. The solid-propellant rocket motor 70 may be of a conventional design with thrust and range capabilities selected in accordance with payload 75 delivery requirements. According to various embodiments, the solid-propellant rocket motor 70 may be, for example, a commercially-available Alliant TechSystem Orion 50 solid-propellant rocket motor. Ignition of the solid-propellant rocket motor 70 may be performed subsequent to second stage 15 separation from the first stage 10 using, for example, an electronically-activated explosive charge.

As an alternative to the solid-propellant rocket motor 70, embodiments of the payload delivery vehicle 5, 80 may include a second jet engine (not shown) as the second stage 15 propulsion system.

As noted above with respect to the embodiments of FIGS. 1a and 1b and FIG. 2, the second stage 15 may include a payload 75. The payload 75 may be substantially conical in shape and, according to various embodiments, comprise a conventional reentry vehicle (RV). According to other embodiments, the payload 75 may comprise a satellite and be configured for satellite transport. The payload 75 may be configured for interchangeability with the solid-propellant rocket motor 70 and tailored to meet particular flight requirements. For example, according to various embodiments, the payload 75 may comprise materials and/or coatings for providing desired IR and/or RF signatures during its flight. Embodiments of the payload 75 may comprise a GNC assembly (not shown), separate from that of the first stage 10, and one or more of steering rockets (not shown), moveable flaps (not shown), and internal weight-shifting mechanisms (not shown) for providing second stage 15 maneuvering capabilities during powered and un-powered phases of its flight. Components of the payload 75 GNC assembly and their general functions may be similar to those described above with respect to the GNC assembly 65 of the first stage 10.

According to various embodiments, the payload delivery vehicle 5, 80 may be used for simulating a variety of scenarios representative of a missile threat in order to evaluate a tactical ballistic missile interceptor system. For example, the payload delivery vehicle 5, 80 may be launched from a ground-based launch site and flown to a pre-determined location for second stage 15 ignition. Flown in a manner to simulate the flight characteristics of a tactical ballistic missile warhead, the second stage 15 solid-propellant rocket motor 70/payload 75 combination, or alternatively, the payload 75 alone, may serve as a test target for an intercept vehicle.

Figure 3A:
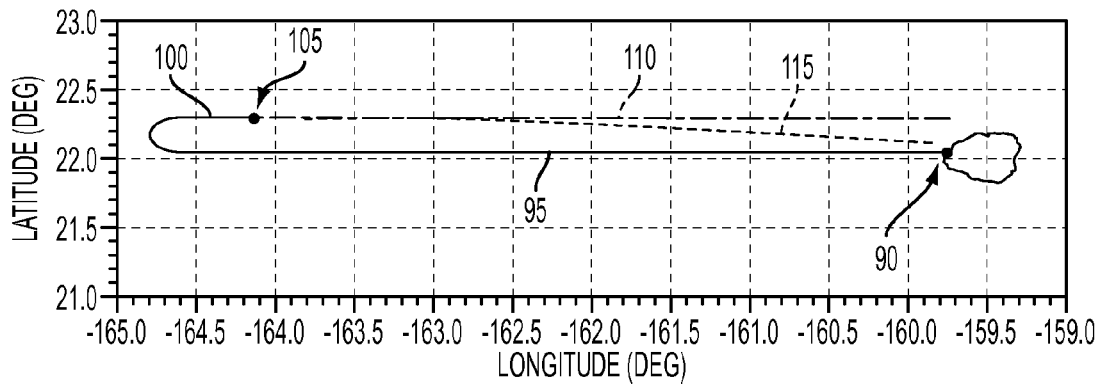
FIG. 3a illustrates a method of enacting a threat-representative scenario using a post-turn deployment option, according to various embodiments.
Figure 3B:
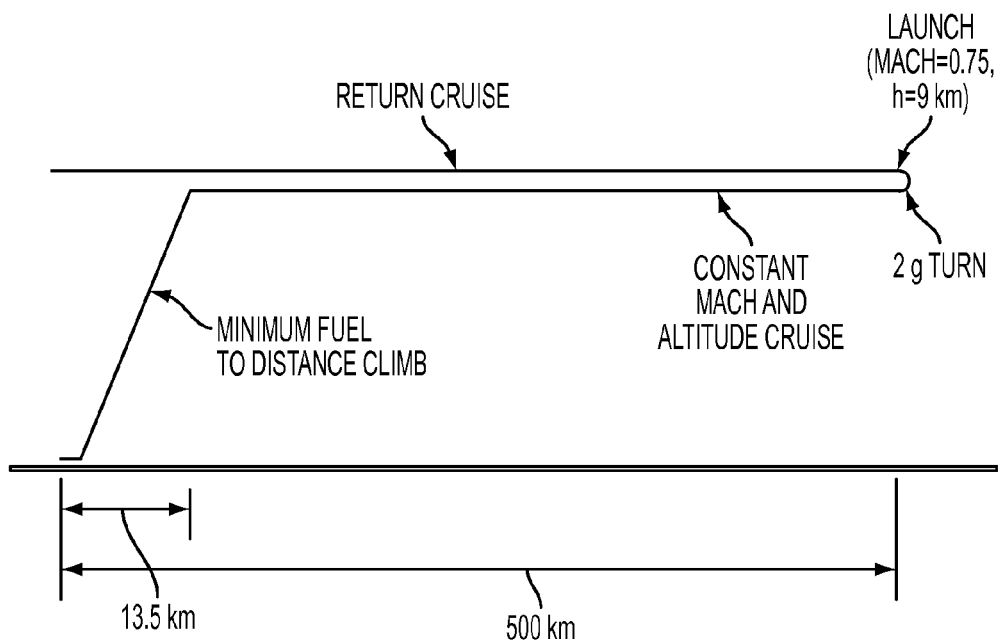
FIG. 3b illustrates a flight profile corresponding to the scenario enactment of FIG. 3a, according to various embodiments.

FIG. 3a illustrates a method of enacting a threat-representative scenario using a post-turn deployment ("flyback") option whereby the payload 75 is deployed by the payload delivery vehicle 5, 80 in a manner so as to simulate an incoming missile, according to various embodiments. FIG. 3b illustrates a flight profile corresponding to the scenario enactment of FIG. 3a, according to various embodiments. As shown in FIG. 3a, the payload delivery vehicle 5 may be launched from a launch site 90 and flown along an outgoing flight path 95 that is in a direction away from the launch site 90. At the terminus of the outgoing flight path 95, the payload delivery vehicle 5, 80 may be turned and oriented such that its flight is along an incoming flight path 100 that is generally parallel to and in a direction opposite to the outgoing flight path 95. At launch location 105 on the incoming flight path 100, second stage 15 separation and ignition is initiated. According to various embodiments, the first and second stages 10, 15 may then be separately flown toward the launch site 90 along incoming flight paths 110, 115, respectively. According to such embodiments, the first stage 10 may be flown to and recovered at pre-determined landing site, such as, for example, the launch site 90. According to other embodiments, the operation of the jet engine 20 may be terminated shortly after second stage 15 separation, after which the first stage 10 recovery system 60 may be deployed. The ability of an interceptor system to address an incoming missile threat may then be evaluated by launching an intercept vehicle (not shown) from the launch site 90 to attempt an interception of the second stage 15, or alternatively, the payload 75.

As shown in FIG. 3b by way of example only, the outgoing flight path 95 may cover a distance of approximately 500 km and may be flown at constant altitude and speed subsequent to performing a minimum fuel-to-distance climb. Also by way of example, second stage 15 separation may occur at a speed and altitude of Mach 0.75 and 9 km, respectively, subsequent to the execution of a 2 g turn for transitioning the payload delivery vehicle 5, 80 the outgoing flight path 95 to the incoming flight path 100.

Figure 4A:
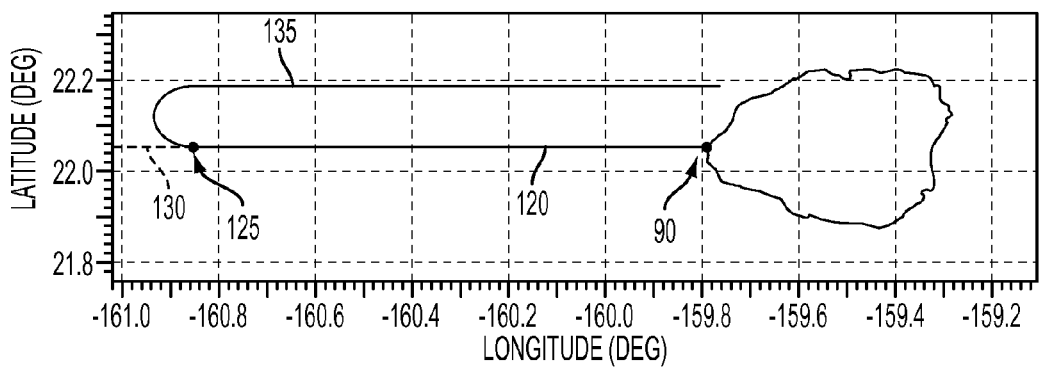
FIG. 4a illustrates a method of enacting a threat-representative scenario using a high-speed deployment option.
Figure 4B:
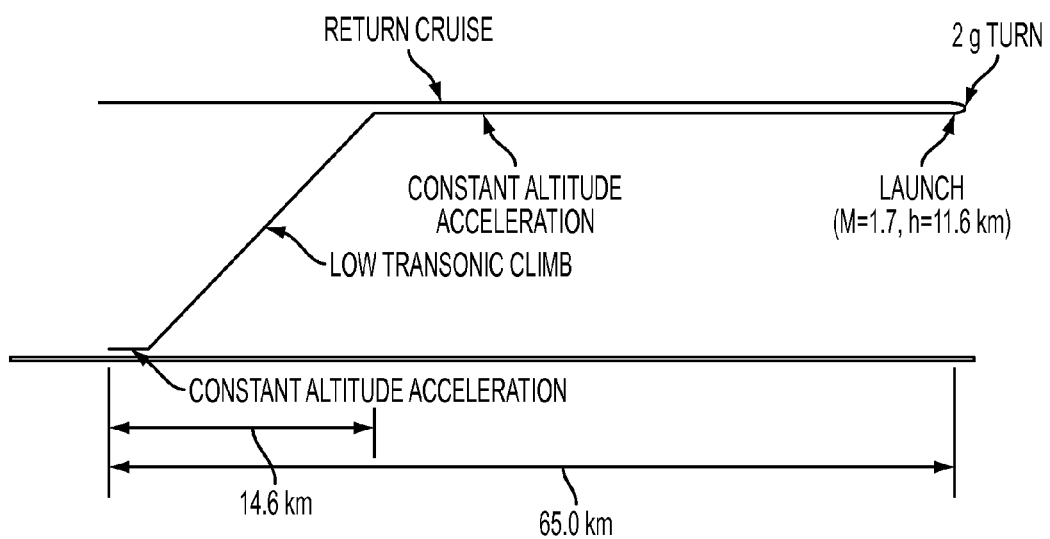
FIG. 4b illustrates a flight profile corresponding to the scenario enactment of FIG. 4a, according to various embodiments.

FIG. 4a illustrates a method of enacting a threat-representative scenario using a high-speed deployment option whereby the payload 75 is deployed by the payload delivery vehicle 5, 80 to simulate a short-range or medium-range deployment, according to various embodiments. FIG. 4b illustrates a flight profile corresponding to the scenario enactment of FIG. 4a, according to various embodiments. As shown in FIG. 4a, the payload delivery vehicle 5, 80 may be launched from the launch site 90 and flown along an outgoing flight path 120 that is in a direction away from the launch site 90. Second stage 15 separation and ignition may be initiated at launch location 125, thus marking the terminus of the outgoing flight path 120. Subsequent to second stage 15 ignition, the second stage 15 may be flown along an outgoing flight path 130 coinciding with the direction of the outgoing flight path 120. According to various embodiments, the first stage 10 may then be turned and oriented such that its flight is along an incoming flight path 135 that is generally parallel to and in a direction opposite to the outgoing flight path 120. According to such embodiments, the first stage 10 of the payload delivery vehicle 5 may be flown to and recovered at a pre-determined landing site such as, for example, the launch site 90. According to other embodiments, the operation of jet engine 20 may be terminated shortly after second stage 15 separation, after which the first stage 10 recovery system 60 may be deployed. An intercept vehicle launched from an interceptor system positioned downrange of the outgoing flight path 130 may be used to attempt an interception of the second stage 15, or alternatively, the payload 75. As shown in FIG. 4b by way of example only, the outgoing flight path 120 covers a distance of approximately 65 km and may be flown at constant altitude and acceleration subsequent to performing a low transonic climb. Also by way of example, second stage 15 separation may occur at a speed and altitude of Mach 1.7 and 11.6 km, respectively, immediately prior to the execution of a 2 g turn by the first stage 10 for transitioning from the outgoing flight path 120 to the incoming flight path 135.

Figure 5:
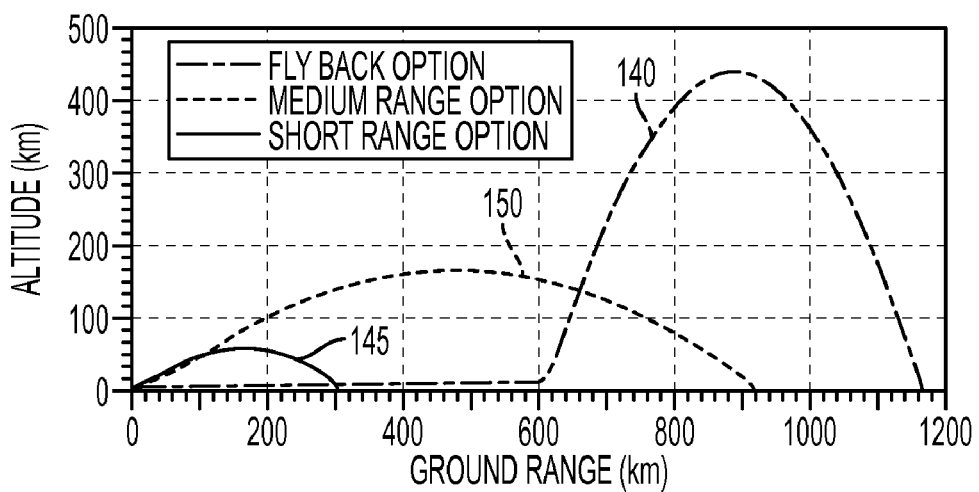
FIG. 5 shows payload trajectories that may be obtained by implementing a flyback option, a short-range option, and a medium-range option, respectively, according to various embodiments.

FIG. 5 shows examples of payload trajectories 140, 145, 150 that may be obtained by implementing a flyback option of FIG. 3a, a short-range option, and a medium-range option, respectively. Trajectory 140 shows a ground range of approximately 1160 km and a maximum altitude of approximately 420 km. Trajectory 145 shows a ground range of approximately 300 km and a maximum altitude of approximately 60 km. Trajectory 150 shows a ground range of approximately 920 km and a maximum altitude of approximately 180 km.

In addition to its uses for evaluating tactical ballistic missile interceptor systems, embodiments of the payload delivery vehicle 5, 80 may be used for the deployment of a payload 75 comprising a satellite. According to such embodiments, the payload delivery vehicle 5, 80 may be launched and flown to an altitude determined by the service ceiling of the jet engine 20. Embodiments of the payload delivery vehicle 5, 80 comprising a low-bypass turbofan jet engine may have a service ceiling of approximately nine miles, for example. Second stage 15 separation and ignition may then be performed, and the payload 75 flown into a low earth orbit (LEO) for deployment of the satellite. The increase in efficiency gained by using the jet engine 20 in the first stage 10 permits a larger payload 75 size than is possible using a solid-propellant rocket motor having comparable thrust capabilities.

Furthermore, embodiments of the payload delivery vehicle 5, 80 may be used to simulate piloted aircraft threats such as, for example, F-16, J-10, and MiG-29 aircraft threats. According to such embodiments, the first stage 10 of the payload delivery vehicle may be flown without the second stage 15 or payload 75.

Whereas particular embodiments of the invention have been described herein for the purpose of illustrating the invention and not for the purpose of limiting the same, it will be appreciated by those of ordinary skill in the art that numerous variations of the details, materials, configurations and arrangement of components may be made within the principle and scope of the invention without departing from the spirit of the invention. The preceding description, therefore, is not meant to limit the scope of the invention.

The invention claimed is:

1. A multi-stage payload delivery vehicle, comprising:
   a first stage comprising:
      a jet engine;
      a recovery system for recovering the first stage, wherein the recovery system comprises one of a parachute and a parafoil; and
      a microprocessor-based control system to control a deployment parameter of the payload delivery vehicle;
   at least one solid-propellant booster rocket motor coupled to the first stage; and
   a second stage comprising:
      a solid-propellant rocket motor; and
      a payload comprising:
         a ballistic missile reentry vehicle; and
         at least one of a material and a coating for providing one of an infrared signature and a radio-frequency signature representative of a ballistic missile;
   wherein the payload delivery vehicle is un-manned and configured for ground-based launch using one of a launch pad comprising a launch surface substantially normal to a thrust of the jet engine during launch and a rail launch system, wherein the jet engine generates thrust to continually power an ascent of the payload delivery vehicle until separation of the first and second stages, wherein the at least one solid-propellant booster rocket motor augments the thrust of the jet engine during a portion of the ascent and is subsequently jettisoned from the first stage, wherein the microprocessor-based control system is programmed to terminate in-flight operation of the jet engine after separation of the first and second stages, and wherein the recovery system is configured for deployment after separation of the first and second stages and after operation of the jet engine is terminated to control a descent of the first stage.

2. The multi-stage payload delivery vehicle of claim 1, wherein the first stage further comprises an airframe assembly attached to the jet engine.

3. The multi-stage payload delivery vehicle of claim 2, wherein the first stage further comprises a pylon assembly for detachably coupling the first stage to the second stage such that the first and second stages define first and second parallel longitudinal axes, respectively.

4. The multi-stage payload delivery vehicle of claim 2, further comprising an interstage assembly for detachably coupling the first stage to the second stage such that the first and second stages define a common longitudinal axis.

5. The multi-stage payload delivery vehicle of claim 1, wherein the jet engine is a low-bypass turbofan jet engine.

6. The multi-stage payload delivery vehicle of claim 5, wherein the jet engine has a dry thrust-to-mass ratio of at least 6.

7. The multi-stage payload delivery vehicle of claim 1, wherein the jet engine is a non-man rated jet engine.

8. The multi-stage payload delivery vehicle of claim 1, wherein the first stage further comprises at least one air intake assembly for directing an airflow into the jet engine.

9. The multi-stage payload delivery vehicle of claim 1, wherein the first stage further comprises at least one of a stabilizer and a wing attached to the airframe assembly.

10. The multi-stage payload delivery vehicle of claim 1, wherein the first stage further comprises at least one fuel tank for storing a fuel supply for the jet engine.

11. The multi-stage payload delivery vehicle of claim 1, wherein at least one of the first stage and the second stage comprises a guidance, navigation, and control (GNC) assembly.

12. An un-manned multi-stage payload delivery vehicle, comprising:
a first stage comprising a jet engine;
at least one solid-propellant booster rocket motor coupled to the first stage;
a second stage comprising a solid-propellant rocket motor; and
an interstage assembly for detachably coupling the first stage to the second stage such that the first and second stages are aligned coaxially;
wherein the payload delivery vehicle is configured for ground-based launch using one of a rail launch system and a launch pad, wherein the jet engine generates thrust to continually power an ascent of the payload delivery vehicle until separation of the first and second stages, and wherein the at least one solid-propellant booster rocket motor augments the thrust of the jet engine during a portion of the ascent and is subsequently jettisoned from the first stage.

13. A payload delivery vehicle, comprising:
two and only two stages, wherein the two stages comprise a first stage and a second stage, and wherein the payload delivery vehicle is configured for un-manned flight;
wherein the first stage comprises a jet engine for generating thrust to continually power an ascent of the payload delivery vehicle until separation of the first and second stages, at least one solid-propellant booster rocket motor for augmenting the thrust of the jet engine during a portion of the ascent and subsequently jettisoning from the first stage, a recovery system for deployment after separation of the first and second stages to control a descent of the first stage, and a microprocessor-based control system to control a deployment parameter of the payload delivery vehicle;
wherein the second stage comprises a solid-propellant rocket motor and a payload for simulating flight characteristics of a ballistic missile; and
wherein the microprocessor-based control system is programmed to terminate in-flight operation of the jet engine after separation of the first and second stages and prior to deployment of the recovery system.

\* \* \* \* \*